United States Patent
Jayaraman et al.

(10) Patent No.: US 9,688,247 B1
(45) Date of Patent: Jun. 27, 2017

(54) METHOD AND APPARATUS FOR DIGITAL TEMPORARY VEHICLE KEY UTILIZATION

(71) Applicant: FORD GLOBAL TECHNOLOGIES, LLC, Dearborn, MI (US)

(72) Inventors: Vijayababu Jayaraman, Novi, MI (US); Ali Mohamad Suleiman, Dearborn, MI (US); Karl Nathan Clark, Belleville, MI (US); Mohamad Nasser, Dearborn Heights, MI (US); John Naum Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/227,312

(22) Filed: Aug. 3, 2016

(51) Int. Cl.
*H04L 9/32* (2006.01)
*B60R 25/24* (2013.01)
*G07C 9/00* (2006.01)

(52) U.S. Cl.
CPC .......... *B60R 25/24* (2013.01); *G07C 9/00309* (2013.01); *G07C 9/00896* (2013.01); *H04L 9/32* (2013.01); *G07C 9/00182* (2013.01); *G07C 9/00817* (2013.01)

(58) Field of Classification Search
CPC ............ G07C 9/00103; G07C 9/00309; G07C 9/00817
USPC .......... 340/5.1, 5.2, 5.28, 5.6, 5.7, 5.72, 5.8, 340/5.81, 7.1, 7.2
See application file for complete search history.

(56) References Cited

U.S. PATENT DOCUMENTS

| | | | | |
|---|---|---|---|---|
| 8,768,565 B2* | 7/2014 | Jefferies | ................ | G07B 15/00 701/29.6 |
| 9,365,188 B1* | 6/2016 | Penilla | ................ | B60R 25/2018 |
| 2006/0170533 A1* | 8/2006 | Chioiu | ............... | G07C 9/00103 340/5.61 |
| 2007/0200671 A1* | 8/2007 | Kelley | .................. | B60R 25/257 340/5.72 |
| 2011/0195699 A1* | 8/2011 | Tadayon | .............. | H04B 5/0062 455/418 |
| 2013/0321178 A1* | 12/2013 | Jameel | ................... | G08G 1/202 340/989 |
| 2013/0338914 A1* | 12/2013 | Weiss | ................. | G08G 1/09626 701/465 |
| 2015/0145647 A1* | 5/2015 | Engel-Dahan | ..... | G07C 9/00571 340/5.61 |
| 2015/0206206 A1 | 7/2015 | Puente et al. | | |
| 2016/0050699 A1 | 2/2016 | Boss et al. | | |
| 2016/0055699 A1* | 2/2016 | Vincenti | ............ | G07C 9/00309 340/5.61 |

* cited by examiner

*Primary Examiner* — Carlos E Garcia
(74) *Attorney, Agent, or Firm* — Jennifer Stec; Brooks Kushman P.C.

(57) ABSTRACT

A system includes a processor configured to receive vehicle borrower contact information input from a vehicle lender. The processor is also configured to send a digital invitation to use a vehicle using the borrower contact information responsive to the input, and to receive digital confirmation responsive to the electronic invitation. The processor is also configured to establish a digital key responsive to the confirmation and wirelessly send the established digital key to the borrower and the vehicle.

15 Claims, 4 Drawing Sheets

US 9,688,247 B1

METHOD AND APPARATUS FOR DIGITAL TEMPORARY VEHICLE KEY UTILIZATION

TECHNICAL FIELD

The illustrative embodiments generally relate to a method and apparatus for digital temporary vehicle key utilization.

BACKGROUND

Vehicles are often loaned to a friend or family member. Usually this involves physical hand-off of a key, or placement of the key in a secure or secret location until the borrower arrives at a vehicle. Of course, this means that the owner will have to arrange some manner of physical key transfer and return.

Ride-sharing systems for loaning a vehicle to the general public or renting a vehicle may use a digital key provided to a renter or borrower. The borrower/renter can use this key (or code) to unlock and start the vehicle. Typically, the borrower will utilize an application or website through a third party to obtain the key and pay for vehicle usage. Again, this involves some level of advance planning by the owner, although that planning may be limited to an initial sign up and ensuring the vehicle is left in an accessible location for the renter.

SUMMARY

In a first illustrative embodiment, a system includes a processor configured to receive contact information for a vehicle borrower from a vehicle lender. The processor is also configured to send a digital invitation to use a vehicle using the borrower contact information, responsive to the input and receive digital confirmation responsive to the electronic invitation. The processor is also configured to establish a digital key responsive to the confirmation and wirelessly send the established digital key to the borrower and the vehicle.

In a second illustrative embodiment, a computer-implemented method includes sending a digital invitation including registration instructions to use a vehicle to a borrower, responsive to lender input of borrower contact information. The method also includes receiving acceptance of the invitation by borrower registration in accordance with the registration instructions. The method further includes generating a digital vehicle key responsive to the acceptance and sending the digital vehicle key to the borrower and to the vehicle.

In a third illustrative embodiment, a system includes a processor configured to receive a vehicle start request from a vehicle occupant. The processor is also configured to communicate with an occupant device to determine if a digital key is stored on the occupant device. The processor is further configured to determine whether a use restriction associated with the digital key is met and responsive to the use restriction being met, start a vehicle responsive to the presence of the digital key stored on the occupant device.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
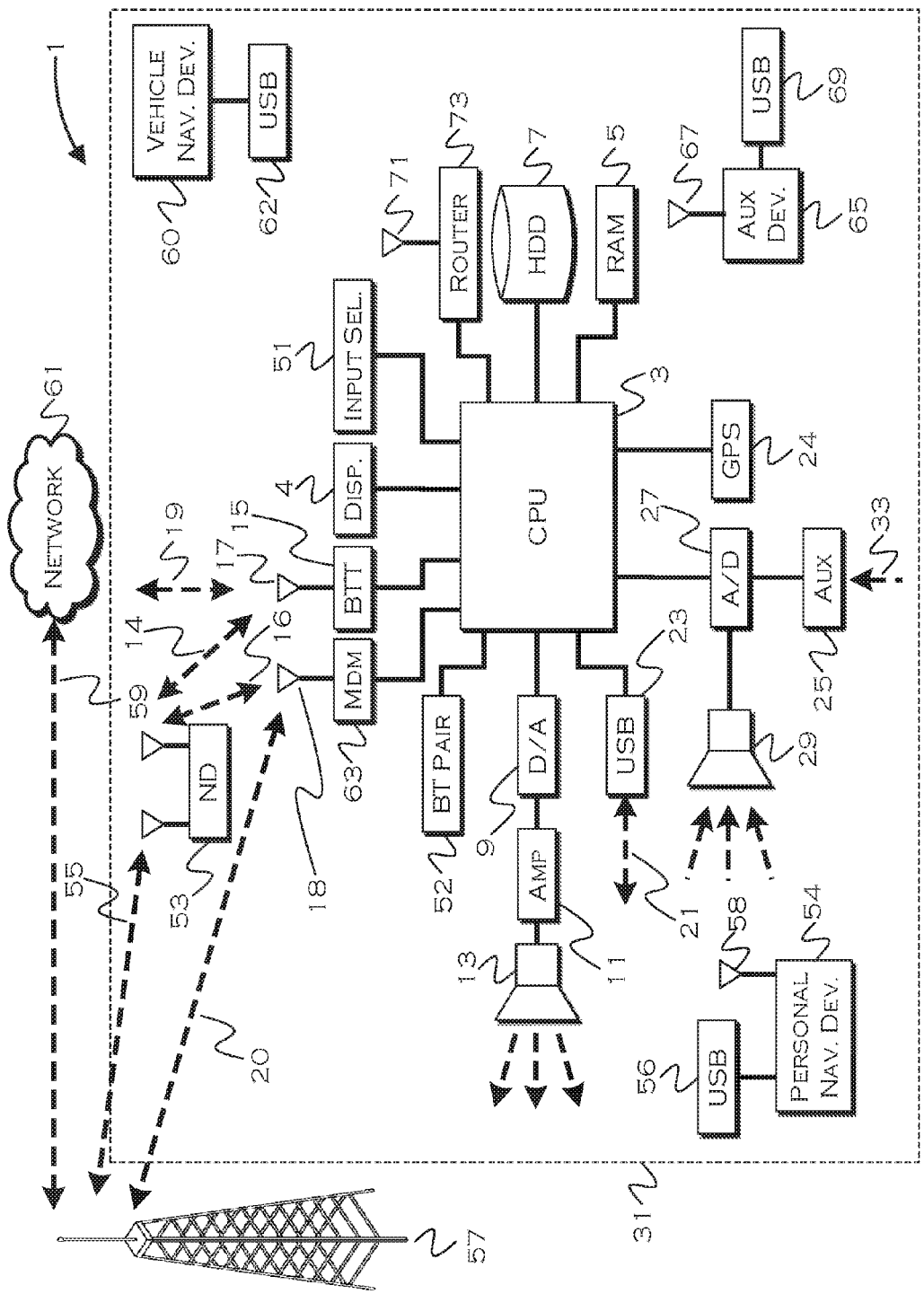
FIG. 1 illustrates a representative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Illustrative communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having illustrative processes executed by a vehicle computing system located in a vehicle, in certain embodiments, the illustrative processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an illustrative, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the illustrative processes as desired.

With respect to the illustrative embodiments described in the figures showing illustrative process flows, it is noted that a general purpose processor may be temporarily enabled as a special purpose processor for the purpose of executing some or all of the illustrative methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Ride sharing and temporary vehicle rental systems have been proposed that allow for registered users to either rent or request to rent a vehicle. These systems often involve the transfer of a digital key, which can be created for use during a rental period. These systems represent a pre-planned arrangement between an owner and a renter, and usually also involve a third-party intermediary facilitating the rental arrangement as well as collecting payment. Use of such a system could also involve some transfer of payment to the third party for use of the rental system.

There are many occasions in life when a vehicle owner may wish to loan a vehicle to a friend or family member without any formalized agreement. The loan could be a short-term loan for a move or temporary use of a vehicle with enhanced cargo carrying capability. In another example, an owner may be stranded and may want a friend or family member (who does not have a key) to come to pick them up. In rare instances, the owner may have started the vehicle with a push-button start, gone back into the house, set down a key, and driven off without the key in possession. In this latter instance, having an ability to obtain a digital key would be useful.

In all of the preceding examples, the loaning of a vehicle or use of a temporary digital key may be useful in the absence of a formalized arrangement. To avoid transfer cost, setup time and other hassle involved, both parties may not want to use a ride-sharing website. Additionally, the owner may not want to generally offer the vehicle for public use, but the ride-sharing website may not provide any means for selectively enabling a single user to request the vehicle (and thus the digital key). Also, since the ride-sharing website may collect a portion of payment, there may not be a designed methodology for allowing a borrowing user to use the vehicle for free. There is also an additional constraint of requiring the borrower to sign up for the service, with which the borrower may be unfamiliar at the time the request is made.

For example, if user A asked user B to come pick user A up using user A's vehicle, user B may not want to or know how to go to a designated website and engage in a registration process, search process, selection process and rental request process. In the example where the owner finds themselves stranded without their own key, the ride-sharing solution would involve the owner essentially renting their vehicle from themselves.

The illustrative embodiments provide systems and methods whereby a user can easily designate a borrower and loan a vehicle through a temporary digital key. The borrower need not even be registered for key reception in advance, by simply having an email address (or other communication identification) the borrower is eligible to receive the key. This can create a system where it is much easier to loan a vehicle to a trusted friend or family member and remove much of the hassle and cost of using predesignated third-party vehicle rental websites.

In a simple example, Ali owns two vehicles and wants to loan a vehicle to Vijay. Ali accesses a website or application associated with his vehicle, managed by an original equipment manufacturer (OEM) who built Ali's vehicle. Using the website or application, Ali sends an invite to an email address or text message number provided to Vijay. Vijay then receives the email or text with the invitation to borrow the vehicle. Vijay can click a link to accept the key (and possibly to register with the service, if such registration is required). Using the accepted digital key, Vijay can then access and use the vehicle for a specified time period. Ali has thus quickly and easily loaned his vehicle to Vijay for a temporary period of time, without involving any payment or advance planning on the part of Vijay (such as preregistering for a service). Security features can be added that require some verification from Vijay, but generally this process provides a much faster and easier way to loan a vehicle than existing solutions.

Figure 2:
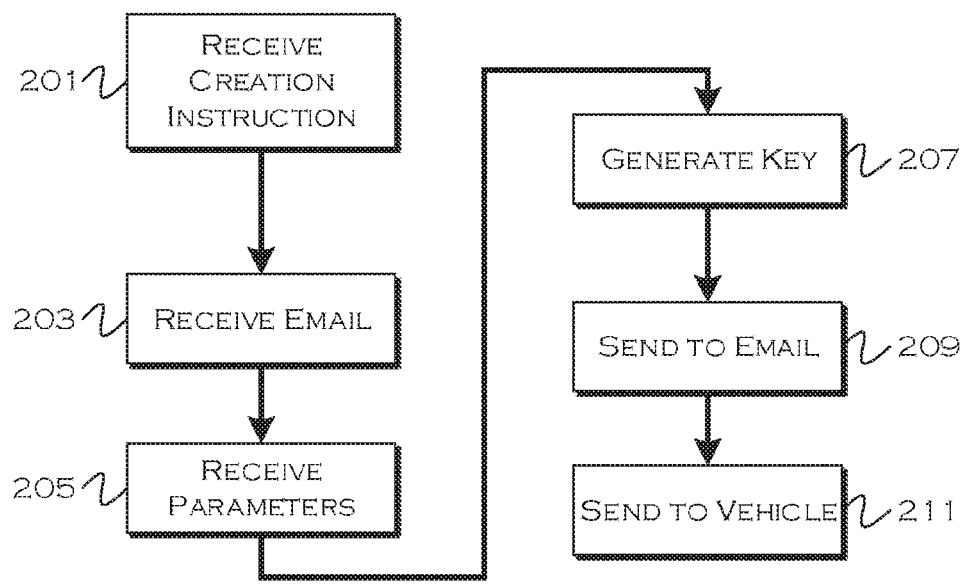
FIG. 2 illustrates a representative process for digital key creation.

FIG. 2 illustrates a representative process for digital key creation. In this illustrative example, the user accesses a website or mobile device application and requests digital key creation 201. At this point the user may also input some verification information, to prevent someone from stealing a phone and using the application to create a digital key, so security can be added as desired and appropriate upon implementation.

The application receives input of an intended recipient's email address 203, text-capable phone number or other identification at which the borrower can receive a message. If the lender knows that the borrower has a corresponding application similarly installed on a wireless device, the username for that application can also be received. But even in the absence of such an application, the lender can extend the offer to borrow the vehicle by sending a common email or text message to an existing reception identifier.

The application also receives input specifying parameters that apply to the vehicle loan 205. The owner can input any number of limiting parameters that restrict access and/or aspects of the drive. The owner can set load limits, speed limits and other usage parameters. The owner can establish a geo-fence limiting vehicle drive range. The owner can also establish a time parameter to be associated with key usage, such that the key expires following the time limit.

In some instances, the vehicle can easily apply specified limits, such as the case where a maximum speed is specified. In other instances, the vehicle can alert the driver if a limit is reached or breached, as well as alerting the owner. Since an owner may not wish to strand a borrower or the vehicle in a remote area, it may not be the best option to simply disable the vehicle if a geo-fence is breached or if a vehicle is used beyond a borrowing limit. In such instances, the vehicle may limit performance or capabilities when operated outside a defined parameter (in addition to notifying the owner). Another alternative is to give the owner (via a message) an option to modify the exceeded parameter. This could be especially useful if a borrowing period runs longer than expected, so that the friend or family member borrowing the vehicle does not have to "limp home" under diminished performance.

While the vehicle could also be lent to strangers in the manner described herein, the illustrative embodiments provide an easy way to loan a vehicle to a trusted borrower. Accordingly, the vehicle response may be tailored to the borrowing party and how much the lender trusts the borrower. The lender may set very limited or even no parameters if the borrower is trusted enough, if for no other reason than to avoid any potential unforeseen complications.

In response to the input of the recipient contact information and the parameters, the application generates (or requests generation of) a digital vehicle key 207. Since the key is digital, the application can associate any restrictive parameters with the key, and those parameters can be recognized and applied by the vehicle when the borrower uses the key to start the vehicle.

The application then sends or instructs sending of the key to a user email address or text number 209. The application may not send the key itself (if the key is in the form of a code), but rather may send an invitation message. The invitation could require some form of acceptance and activation by the intended user, which could include the user inputting a password or other secure feature. While not necessary, this could help avoid a situation where hacking an email account or stealing a phone inadvertently provides access to a vehicle.

The application also sends any relevant information relating to the digital key 211 to the vehicle. In order for the vehicle to receive this information, the vehicle will need an active telematics connection or at least be connected to a wireless access point. Since the vehicle may not have this connection immediately available, the application may alternatively generate an encrypted message packet to be transferred from a borrower wireless device to the vehicle. In such an instance, the borrower would need to bring along the wireless device to access the vehicle, and the device could serve as both the key and the carrier for the encrypted verification information relating to the key. The vehicle could connect to the wireless device to receive the encrypted packet, decrypt the packet revealing the verification information and key parameters, and then enable the key on the basis of the decrypted information.

In this latter scenario, the system would have to be designed such that the vehicle could communicate, at least on a limited basis, with a previously unknown wireless device. Accordingly, the application could provide a generalized key such as a numeric code that allows limited vehicle entry and startup (power to communication systems but not the engine, for example) that would also be recognized as a facilitation key by the vehicle. Because the vehicle would have no prior knowledge of the key in this scenario, the key might be based on a rolling code known by the vehicle or other persistent method of random key generation in the absence of direct communication. Also, in this example, as noted, the generalized key would merely facilitate transfer of information related to the startup and use key, as an added security measure to provide accessibility when the originating application could not otherwise remotely provide the vehicle with the startup and use key remotely.

Figure 3:
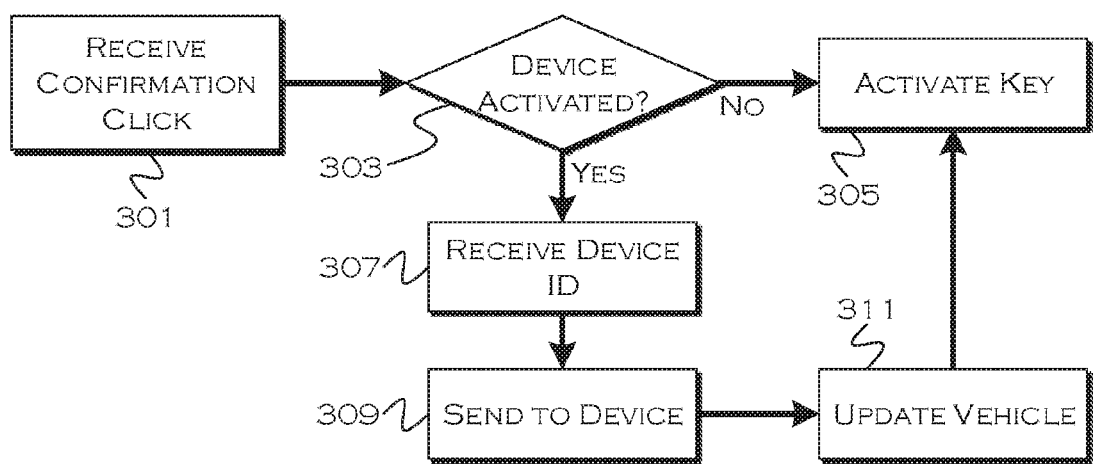
FIG. 3 illustrates a representative key reception process.

FIG. 3 illustrates a representative key reception process. In this example, the receiving user obtains an email or text message with the invitation to borrow or use the vehicle. Included with the message is a selectable link that provides access to a registration site and/or verifies the acceptance of the key.

In the example shown, a user wireless device will be used to activate the vehicle. While a code could be used for vehicle access and drive away both, using the wireless device prevents easy theft of the code data and, at a minimum, ensures that the accessing user needs the wireless device to start the vehicle. Access to the vehicle in this exampled is enabled by the user utilizing an application request or web-based request that either communicates with a vehicle wireless system (BLUETOOTH, NFC, telematics) or communicates a request to a remote server which sends an unlock signal to the vehicle if the vehicle has such communication capability available.

When the user confirms the acceptance of the key through clicking on the link and/or registering for use, the process receives the confirmation 301 and determines if this instance of the key involves a device-activated vehicle or simple input of a code 303. If the user wireless device is involved in vehicle access and/or activation, the process receives an identification of the device from the borrower 307. This can involve installing and application on the device and identifying the device via the application, providing a mobile number for an activation link to be sent to the device, or otherwise identifying the device to receive the key data.

The process sends the relevant key data needed to access the vehicle to the device 309, along with any additional data that the device may need to transfer to the vehicle if direct communication with the vehicle from the remote server executing the process is not available. If communication with the vehicle is available, the process updates the vehicle with device identifying information, so that the vehicle can approve startup based on the presence of or pairing with the identified device 311. The process can then communicate with the vehicle to activate the digital key for use during a specified time period 305. This activation can occur whether or not a code or device is used to access the vehicle. If communication with the vehicle is not presently available, the process can either embed encoded activation information on the device or continue to try to communicate with the vehicle until communication is available.

Figure 4:
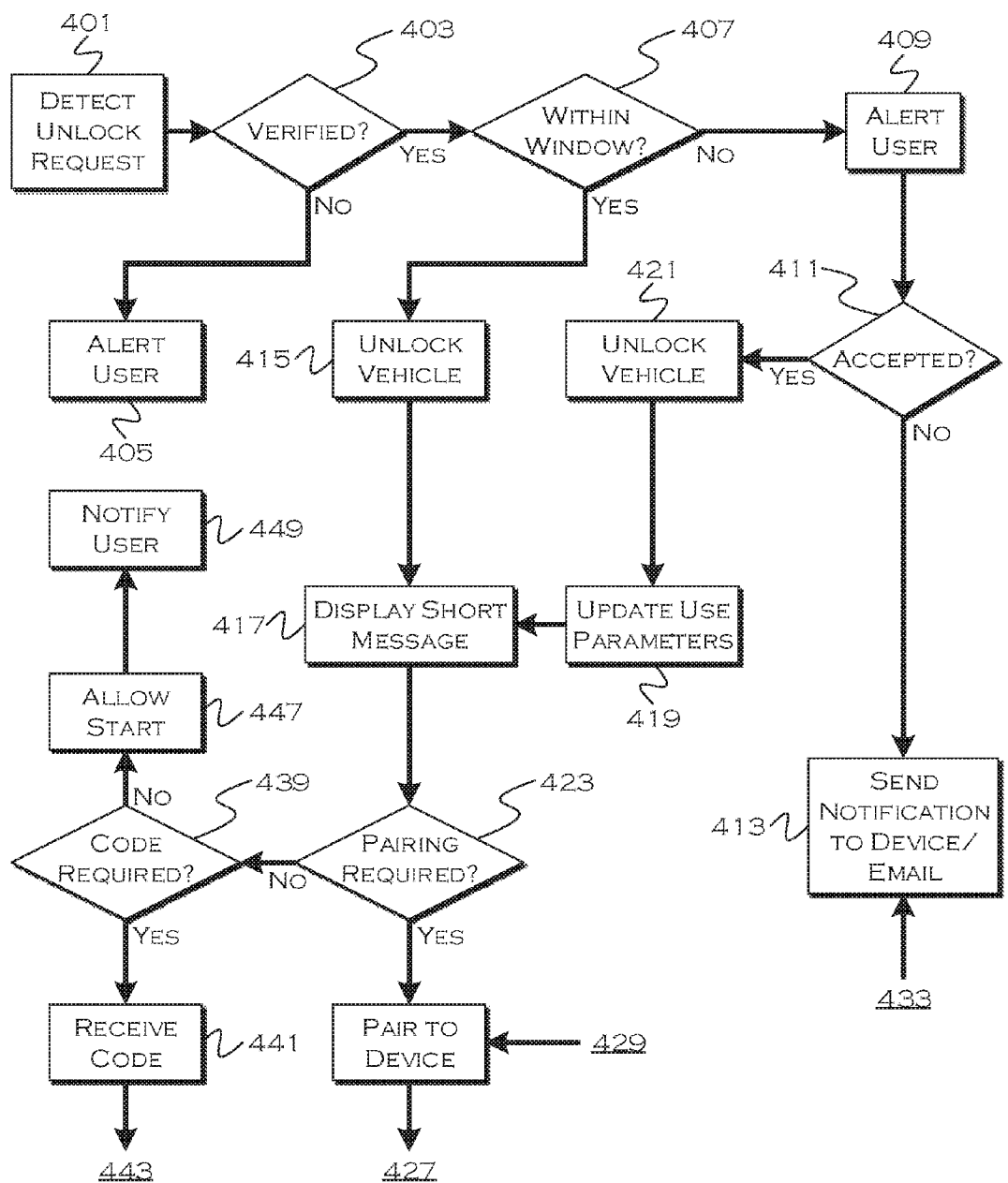
FIG. 4 illustrates a representative key utilization process.
Figure 4:
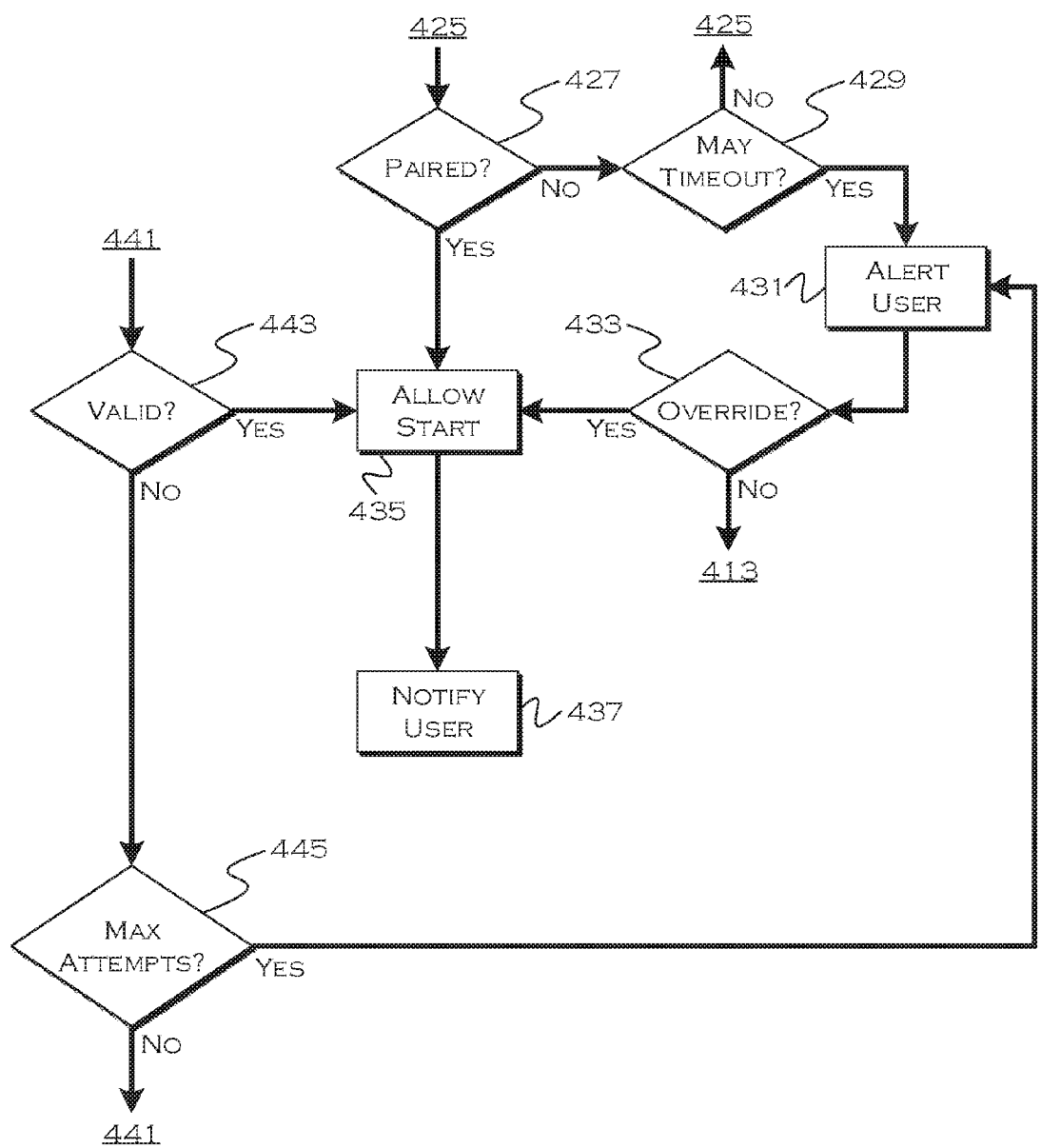

FIG. 4 illustrates an illustrative key utilization process. In this example, the borrower uses a digital key (in the form of a code or device, for example) to access and start the vehicle. A process executing on the vehicle detects an unlock request 401 corresponding to an input code or transmitted from a device. If the borrower used to option to communicate with the vehicle through the cloud, requesting unlock, the verification process may take place in the cloud.

If the request is not verified 403, that is, if an unauthorized code or device is used to attempt to access the vehicle, the process may alert the user 405. This can involve sending a message to the user and activating vehicle alarm and camera systems. If an authorized code or device is used, the process can determine if the request to access the vehicle is within a time window for use specified by a key-parameter 407. If the request is not within the time window, the vehicle can again alert the user 409.

In this instance of the alert, since an authorized code or device was used, but used outside the time window, the vehicle can provide the user with an option to override the time window parameter to permit use. If the user receives the alert and accepts the access request or otherwise modifies the time window parameter 411, this acceptance is communicated back to the vehicle as an unlock approval. If the user declines the request or is unavailable to modify the parameter, the process may send a notification to the borrower text number or email address informing the borrower that the specified time window has not yet occurred and the user is unavailable to override the parameter 413.

If the override request is approved, the vehicle unlocks 421 and updates the use parameters in accordance with the override 419. This can include, for example, extending a time window to encompass the requested use time plus some tolerance, so that the owner is not repeatedly bothered while the borrower drives the vehicle home under an extended window or repeatedly accesses the vehicle in a time period before a previously specified window.

If the original access request was proper and input during the appropriate time window, the vehicle also unlocks 415. A vehicle human machine interface (HMI) or an application on the borrower wireless device then displays a message relating to starting the vehicle 417. This can include, for example, pairing instructions or other instructions for starting the vehicle. The vehicle or device can also display any appropriate use parameters with this message, so the borrower knows about any restrictions associated with the use.

This example demonstrates three possible start cases, although other reasonable variants are also considered. In a first scenario, the vehicle requires pairing of a pre-identified user device 423. In a second scenario, the vehicle requires the borrower to input a start code 439. In the third scenario, vehicle startup is enabled through HMI interaction or push-button starting on the basis of the proper vehicle access code that allowed vehicle access.

In the third scenario, the user either pushes a start button or a start icon without any further code or verification input 447. The vehicle starts and sends a message to the user 449 that the borrower is using the vehicle.

In the second scenario, where the vehicle requires a code input, the process receives code input through the HMI 441. If the code is invalid 443, the process determines if a maximum number of attempts have been used 445. The process permits code input attempts until a user inputs a successful code or reaches the maximum number of input attempts. The process starts the vehicle 435 (or enables push button start) upon verifying a proper code input. Again, the vehicle notifies the user that the borrower is using the vehicle.

In the first scenario the vehicle requires the borrower device to be paired with the vehicle in order to start the vehicle. If the process requires pairing 423, the process provides instructions for pairing the device and enables pairing to allow the vehicle computer to pair with the device 425. The pairing attempts continue until the device is successfully paired 427 or a maximum timeout is reached 429. Pairing in this instance may also only be restricted to a specified device, so that the borrower will need possession of the prespecified device in order to start the vehicle. Once the device and vehicle pair, the process allows the vehicle to start.

If the pairing is unsuccessful due to timeout or if the maximum number of improper code inputs is reached, the vehicle alerts the owner of the unsuccessful start attempt 431. This alert can include, for example, video or audio recording from the cabin so that the owner can see or hear who is trying to start the vehicle. The alert can also provide the owner with an option to override the startup, so that the owner can remotely enable start if an approved party is present in the vehicle. If the owner declines override or is otherwise unavailable for override, the process notifies the borrower that override was unsuccessful.

Once the borrower has started the vehicle, the borrower can use the vehicle subject to the constraints assigned to the digital key. The methods and systems described herein provide a fast and easy way for an owner to loan out a vehicle with little advance legwork or planning.

While illustrative embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive borrower contact information input from a vehicle lender;
send a digital invitation to use a vehicle using the borrower contact information, responsive to the input;
receive digital confirmation responsive to the digital invitation;
establish a digital key responsive to the confirmation; and
wirelessly send the established digital key to the borrower and the vehicle.

2. The system of claim 1, wherein the contact information includes an email address and wherein the digital invitation includes a digital invitation email.

3. The system of claim 1, wherein the contact information includes a phone number and wherein the digital invitation includes a text message.

4. The system of claim 1, wherein the processor is further configured to:
receive a request from a borrower wireless device when a borrower is within a predefined distance from the vehicle; and
responsive to the request, send an unlock instruction to the vehicle.

5. The system of claim 1, wherein the processor is configured to receive restrictions from the vehicle lender and associate vehicle use limitations based on the restrictions with the digital key.

6. The system of claim 5, wherein the use limitations include a usable time window during which the digital key is operational.

7. The system of claim 5, wherein the use limitations include a maximum vehicle speed.

8. The system of claim 5, wherein the use limitations include a maximum vehicle load weight.

9. The system of claim 5, wherein the use limitations include a geo-fence defining an approved area for vehicle use.

10. A computer-implemented method comprising:
sending a digital invitation including registration instructions to use a vehicle to a borrower responsive to a vehicle lender input of borrower contact information;
receiving acceptance of the invitation by borrower registration in accordance with the registration instructions;
generating a digital vehicle key responsive to the acceptance; and
sending the digital vehicle key to the borrower and to the vehicle.

11. The method of claim 10, wherein the generating a digital vehicle key further comprises:
associating a use restriction with the digital vehicle key; and
sending the use restriction to the vehicle along with the digital vehicle key.

12. The method of claim 11, wherein the use restriction includes a usable time window for vehicle use during which the digital key is usable to start the vehicle and outside of which the digital key is not usable to start the vehicle.

13. The method of claim 11, wherein the use restriction includes a maximum vehicle speed.

14. The method of claim 11, wherein the use restriction includes a maximum vehicle load limit.

15. The method of claim 11, wherein the use restriction includes a geo-fence defining an approved area for vehicle use.

* * * * *